(12) United States Patent
Ferguson

(10) Patent No.: US 6,293,838 B1
(45) Date of Patent: *Sep. 25, 2001

(54) MARINE PROPULSION SYSTEM AND METHOD FOR CONTROLLING ENGINE AND/OR TRANSMISSION OPERATION

(75) Inventor: Arthur Richard Ferguson, Glenview, IL (US)

(73) Assignee: Bombardier Motor Corporation of America, Grant, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,819

(22) Filed: Sep. 17, 1999

(51) Int. Cl.[7] ............................ B63H 23/00; B63H 21/21
(52) U.S. Cl. .................................... 440/84; 440/1
(58) Field of Search ....................... 440/1, 2, 84

(56) References Cited

U.S. PATENT DOCUMENTS

| | | | |
|---|---|---|---|
| 4,739,236 | * 4/1988 | Burkenpas | 114/144 A |
| 4,810,216 | * 3/1989 | Kawamura | 440/84 |
| 4,836,809 | * 6/1989 | Pelligrino | 440/2 |
| 5,142,473 | * 8/1992 | Davis | 364/424.01 |
| 5,711,742 | 1/1998 | Leinonen et al. | |
| 5,826,557 | 10/1998 | Motoyama et al. | |

* cited by examiner

Primary Examiner—S. Joseph Morano
Assistant Examiner—Andrew Wright
(74) Attorney, Agent, or Firm—Cook & Franke SC; Timothy J. Ziolkowski

(57) ABSTRACT

An electronic controller is provided for controlling operation of the engine and/or transmission in a marine propulsion system without use of mechanical linkages. A control allows for setting a desired engine speed signal and a signal link allows for electromagnetically transmitting the desired engine speed signal from the control to the controller. A module allows for supplying to the engine, based on a received signal indicative of actual engine speed and the desired engine speed signal, an engine control signal for adjusting engine speed.

38 Claims, 2 Drawing Sheets

MARINE PROPULSION SYSTEM AND METHOD FOR CONTROLLING ENGINE AND/OR TRANSMISSION OPERATION

BACKGROUND OF THE INVENTION

The present invention is related to a marine propulsion system having an engine and a multi-speed transmission coupled to one another to provide mechanical power to, for example, one or more propellers that upon rotation propel a boat in a desired direction and, more particularly, to a propulsion system and method that uses an electronic controller for controlling operation of the engine and/or transmission without use of mechanical linkages.

As described in more detail in the context of FIG. 1, a known marine propulsion system has an automatic multi-speed transmission that is controlled by an electronic controller. Unfortunately, such known marine propulsion system suffers from various deficiencies. For example, such system has its electronic controller specifically designed for monitoring two engine parameters, and in particular uses engine revolution speed and engine load to generate a control signal in response to those two engine parameters. The control signal generated by the controller is, in turn, used to control shifting of the transmission. This known controller requires use of a signal supplied by engine sensors indicative of engine load. More specifically, the engine load is monitored by using an engine sensor either designed to sense engine manifold air pressure or to sense engine throttle valve position. Further, such controller appears to require use of cumbersome mechanical linkages between an operator control handle and the engine and/or transmission.

In view of the foregoing drawbacks, it is desirable to provide a marine propulsion system that advantageously eliminates cumbersome mechanical linkages, such as push-pull cables or rods, from the operator control handle to the engine and/or transmission for setting desired engine and/or transmission operational parameters by use of technology generally referred to as "fly-by-wire" technology, which up to now is believed to have been generally limited to aerospace or military applications. For example, any desired transmission setting, such as forward, neutral and reverse, that the operator selects can now be electromagnetically transmitted, in lieu of being mechanically transmitted via push-pull cables, from the operator control handle to a suitable electromechanical actuator in the transmission. It is further desirable for the propulsion system to have a controller that allows for generating respective shift commands for shifting the transmission from first to second gear or vice versa without having to depend on engine sensors indicative of an engine load signal.

BRIEF SUMMARY OF THE INVENTION

Generally speaking, the foregoing needs are fulfilled by providing a marine propulsion system in a boat having an engine, and wherein the system is made up of a control for setting a desired engine speed signal; a signal link that is coupled to the control to electromagnetically transmit the desired engine speed signal set at the control; and an electronic controller that is coupled to the engine to receive a signal indicative of actual engine speed. The controller is further coupled to receive by way of the signal link the desired engine speed signal to generate, based on the received actual engine speed signal and the desired engine speed signal, an engine control signal for controlling engine speed.

The foregoing needs are further fulfilled by providing a method for controlling a marine engine. The method allows for setting a desired engine speed and for electromagnetically transmitting the desired engine speed signal from the control to a controller by way of a signal link. The method further allows for supplying to the controller a signal indicative of actual engine speed and the desired engine speed signal to generate, based on the respective signal values of the actual engine speed and the desired engine speed, an engine control signal for controlling engine speed.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
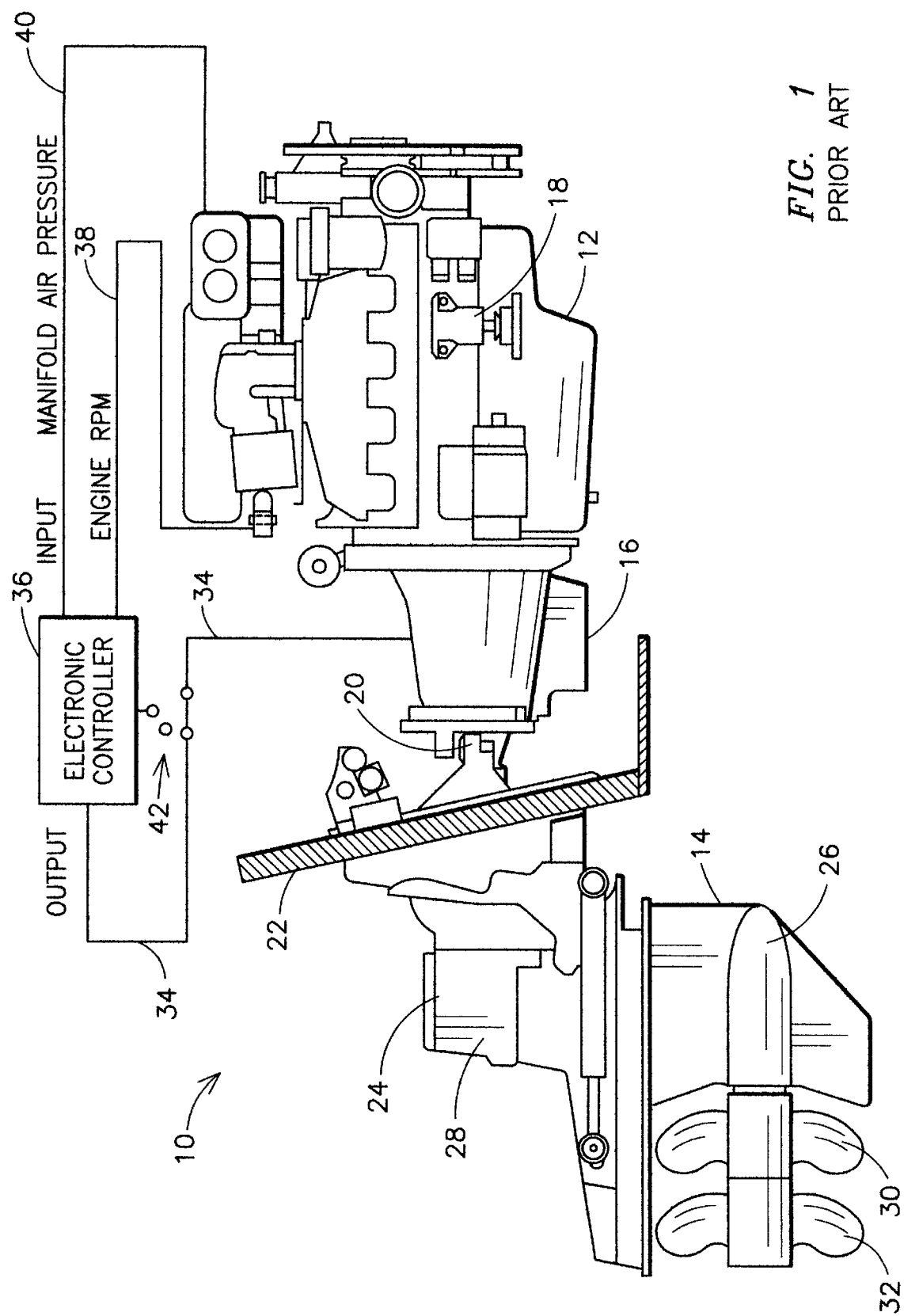
FIG. 1 is a schematic of a prior art propulsion system.

FIG. 1 shows a prior art multi-speed marine propulsion system 10 having an engine 12, a drive unit 14 and an automatic multi-speed transmission 16. The engine 12 is located within a boat having a transom 22. Engine mounts 18 attach the engine 12 to the boat. The engine 12 provides power through a crankshaft rotating at an engine revolution rate. The automatic transmission 16 receives power from the engine crankshaft, through a torsional dampening device, and outputs power to an input shaft 20 of the drive unit 14. The input shaft 20 either extends through or is coupled through the transom 22 of the boat. A gear case 24 is mounted to the exterior of the transom 22. The gear case 24 pivots horizontally and vertically to accommodate a universal joint connected to the input shaft 20. Gears and driveshafts within the gear case 24 transmit the power from the input shaft 20 to one or more propeller shafts located in a torpedo housing 26 of the gear case 24.

The automatic transmission 16 receives power from the engine and in turn transmits that power to the input shaft 20 of the drive unit 14 through either a high gear or a low gear. The automatic transmission 16 has an electronic shifting mechanism such as a transmission shift solenoid. The electronic shifting mechanism receives a control signal that is transmitted through line 34 from an electronic controller 36. The control signal in line 34 could be a 12 volt signal in line 34 to the transmission shift solenoid to actuate and maintain a shift from one gear to another gear (e.g. low to high gear, or high to low gear). The 12 volt signal is controlled by the electronic controller 36. A manual override switch 42 can also be provided. activating the manual override switch 42 can hold the transmission 16 in the low or high gear regardless of the control signal from the electronic controller 36.

The electronic controller 36 monitors two different engine parameters so as to generate the control signal. In system 10, the electronic controller 36 receives an RPM signal in line 38 that is proportional to the revolution rate of the engine 12 crankshaft. As described in U.S. Pat. No. 5,711,742, a notable requirement or limitation of this prior art system is the fact that the electronic controller 36 specifically receives an engine load signal in line 40 that is proportional to the load on the engine 12. One way of monitoring engine load is to monitor the air pressure in the engine manifold using a pressure transducer to measure the intake manifold vacuum. If manifold air pressure is used to monitor engine load, the engine load signal is a manifold vacuum signal that is proportional to the air pressure in the engine manifold. Another less desirable way of monitoring the engine load is to monitor the position of the engine throttle using a throttle position sensor. If a throttle position signal is used to monitor engine load, the load signal is proportional to the position of the throttle. Thus, as described in the foregoing patent, it appears that the manifold vacuum signal on line 40 is generated by an intake manifold air pressure sensor such as a pressure transducer that is in fluid communication with the engine intake manifold. In either case, it will be appreciated by those skilled in the art, that such controller specifically requires monitoring of one or more engine sensors that provide an engine load signal.

Figure 2:
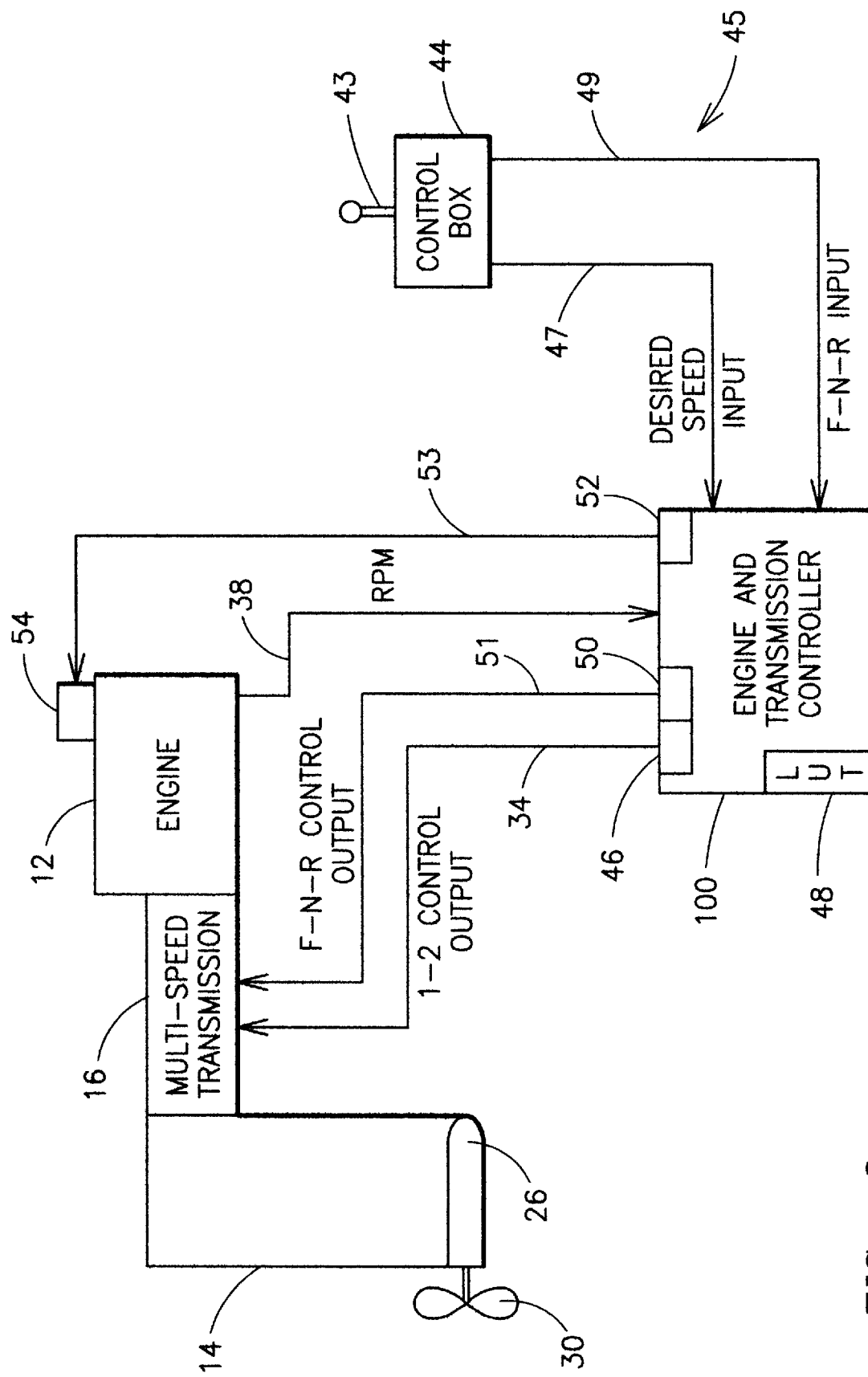
FIG. 2 is a block diagram of the propulsion system of the present invention.

FIG. 2 illustrates the marine control system of the present invention using a controller 100 that is configured for avoiding use of mechanical linkages between a control, and the transmission 16 and the engine 12. The control may be an operator control handle 43 or other suitable electromechanical or electronic control that could be directly operated by the operator or could be remotely operated in response to suitable control signals. Operator control handle 43 may include one or more transducers stored in a control box 44 for generating suitable signals used for setting respective engine and/or transmission parameters. By way of example, one of such signals may be used for setting a desired engine speed signal. Another of such signals, may be a signal indicative of a desired transmission operating condition. In another advantageous feature of controller 100, it will be appreciated by those skilled in the art that controller 100 does not require monitoring of any engine sensor that supplies an engine load signal. As shown in FIG. 2, a signal link 45 allows for electromagnetically transmitting the desired engine speed signal set by the operator through the control handle to the controller. It will be appreciated that signal link 45 need not be limited to a conductive wire, since an optical fiber link, a radio frequency link or an infrared link and the like could be employed in lieu of a copper wire. In either case, a first module 46 is electromagnetically coupled to the multi-speed transmission 16 for supplying, based on the RPM signal supplied through line 38 and the desired engine speed signal supplied through signal link 45 via line 47, a transmission speed control signal supplied via line 34 and configured for having predetermined signal levels that respectively determine whether the transmission 16 operates in a respective one of the transmission speeds, e.g., whether transmission 16 operates in a high gear or a low gear or even in an intermediate gear if the transmission is so equipped. Controller 100 may include a programmable look-up table 48 that contains or has stored therein a plurality of predetermined transmission speed switching values that are retrieved by first module 46 so that upon comparison with the received actual and desired speed signals the first module determines the respective signal level of the transmission speed control signal. It will be appreciated that the values in look-up table 48 may be readily programmed based on the specific engine and/or transmission combination so as to optimize the operational characteristics of the boat, such as improved acceleration at slow speeds. In addition, the look-up table values may be programmed to take into account the type of boat engine used. For example, whether the engine used is a diesel type as opposed to a gasoline type of engine. Other criteria that may be used for programming or selecting the specific look-up values include the principal use intended by the user, for example, the look-up table values will likely require adjustment if the main use of the boat is for low speed operation, such as trolling, or whether the main use is for racing or water skiing.

The control handle can conveniently include a transmission setting unit, (not shown) including push buttons or a suitable multi-position lever that allows for setting a signal indicative of a desired transmission operating condition. Signal link 45 may conveniently include a line 49 for electromagnetically transmitting the desired transmission operating condition signal to the controller. The desired transmission operating condition may correspond to operating the transmission in either forward, reverse or neutral. Controller 100 may further include a second module 50 electromagnetically coupled to the transmission for supplying to the transmission via line 51, based on the desired transmission operating condition signal received from the operator handle, a transmission operating condition control signal having predetermined signal levels that respectively determine whether the transmission operates in a respective one of the desired transmission operating conditions.

The controller further includes an engine control module 52 electromagnetically coupled to the engine 12 to generate a predetermined engine control signal via line 53 to an engine throttle valve 54 for controlling engine operation based, for example, on comparing the signal values of the desired engine speed signal and the actual engine speed signal using well-understood engine control techniques. It will be appreciated that the above-described controller implementation would conveniently allow a boat manufacturer to develop a controller kit that could be conveniently employed for retrofit applications that conveniently avoids mechanical linkages between the operator handle and both the engine and the transmission. Further, the controller kit conveniently avoids having to depend on engine sensors to provide signals indicative of engine load.

As suggested above, in operation the transmission 16 is electronically controlled by the controller 100 through the use of an engine speed input signal set by the operator through the control handle in conjunction with a signal indicative of the actual rotational speed of the engine. By comparing the value of the desired speed set by the operator with the value of the actual speed of the engine, the controller readily determines if the transmission is operating in an optimum gear or speed, that is, whether a presently engaged gear results in substantially efficient operation of the transmission and, if not operating in the optimum gear, then the controller will issue a shift signal to the transmission to shift from the engaged gear to the other gear based on a shift algorithm or the look-up table values stored in the electronic controller. It will be appreciated by those skilled in the art that the foregoing implementation conveniently eliminates having to monitor engine sensors or engine transducers generating signals indicative of engine load, since the improved controller of the present invention does not use any signal supplied by engine sensors indicative of engine load to generate the shifting control signal supplied to the transmission. It will be further appreciated that the foregoing implementation will likely result in measurable savings to the user and enhanced performance since elimination of the mechanical linkages will likely result in a boat having reduced weight, and thus for a given engine size the boat will have more available power due to the elimination of the extra weight or "dead" weight due to such mechanical linkages.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A marine propulsion system having an engine coupled to a transmission operable in a respective one of multiple predefined gears, the system comprising:

a control for setting a desired engine speed signal;

a signal link coupled to the control to electromagnetically transmit the desired engine speed signal set therein; and an electronic controller coupled to the engine to receive a signal indicative of actual engine speed, the controller further coupled to receive by way of the signal link the desired engine speed signal to generate, based on the received actual engine speed signal and the desired engine speed signal, an engine control signal for controlling engine speed, the controller including a first module coupled to the transmission for supplying thereto, based on the received signal indicative of actual engine speed and the desired engine speed signal, with a seperate load indicative signal, a shift control signal for shifting the transmission from one respective gear to another one of the multiple predefined gears.

2. The system of claim 1 further comprising a look-up table configured to store a plurality of predetermined transmission shift values that are retrieved by the first module so that, upon comparison with the received actual and desired speed signals, the first module generates the shift control signal.

3. The system of claim 1 wherein the control for setting the desired speed signal comprises an operator control handle.

4. The system of claim 3 wherein the control handle further provides a unit for setting a signal indicative of a desired transmission operating condition.

5. The system of claim 4 wherein the signal link is further configured to transmit the desired transmission operating condition signal to the controller.

6. The system of claim 5 wherein the controller further comprises a second module coupled to the transmission for supplying thereto, based on the desired transmission operating condition signal received by way of the signal link, a signal for setting the transmission to a respective one of the transmission operating conditions.

7. The system of claim 4 wherein the desired transmission operating condition is selected from the group consisting of forward, reverse, and neutral.

8. The system of claim 1 wherein the controller further includes an engine control module coupled to the engine to generate the predetermined engine control signal for controlling engine operation based on comparing the respective signal values of the actual engine speed and the desired engine speed.

9. A boat having an engine coupled to a transmission operable in a respective one of multiple predefined gears, the boat comprising:

a control for setting a desired engine speed signal;

a signal link coupled to the control to electromagnetically transmit the desired engine speed signal set therein; and an electronic controller coupled to the engine to receive a signal indicative of actual engine speed, the controller further coupled to receive by way of the signal link the desired engine speed signal to generate, based on the received actual engine speed signal and the desired engine speed signal, an engine control signal for controlling engine speed, the controller including a first module coupled to the transmission for supplying thereto, based on the received signal indicative of actual engine speed and the desired engine speed signal, a shift control signal for shifting the transmission from one respective gear to another one of the multiple predefined gears, the controller further including memory configured to store a plurality of predetermined transmission shift values that are retrieved by the first module so that, upon comparison with the received actual and desired speed signals, without a seperate load indicative signal, the first module generates the shift control signal.

10. The boat of claim 9 further comprising a look-up table configured to store a plurality of predetermined transmission shift values that are retrieved by the first module so that, upon comparison with the received actual and desired speed signals, the first module generates the shift control signal.

11. The boat of claim 9 wherein the signal link is further configured to transmit a desired transmission operating condition signal to the controller.

12. The boat of claim 11 wherein the controller further comprises a second module coupled to the transmission for supplying thereto, based on the desired transmission operating condition signal received by way of the signal link, a signal for setting the transmission to a respective one of the transmission operating conditions.

13. The boat of claim 9 wherein the control for setting the desired speed signal comprises an operator control handle.

14. The boat of claim 13 wherein the control handle further provides a unit for setting a signal indicative of a desired transmission operating condition.

15. The boat of claim 14 wherein the desired transmission operating condition is selected from the group consisting of forward, reverse, and neutral.

16. The boat of claim 9 wherein the controller further includes an engine control module coupled to the engine to generate the predetermined engine control signal for controlling engine operation based on comparing the respective signal values of the actual engine speed and the desired engine speed.

17. A controller for controlling a marine engine and a transmission operatively coupled to one another to provide mechanical power to a propeller that upon rotation propels a boat in a desired direction, the transmission operable in respective one of multiple predefined gears, the controller comprising:

a control for setting a desired engine speed signal;

a signal link coupled to the control to electromagnetically transmit the desired engine speed signal set therein;

an engine speed control module coupled to the engine to receive a signal indicative of actual engine speed, the module further coupled to receive by way of the signal link the desired engine speed signal to generate, based upon comparison of the received actual engine speed signal and the desired engine speed signal, an engine control signal for controlling engine speed;

a transmission shift module coupled to the transmission for supplying thereto, based on the received signal indicative of actual engine speed and the desired engine speed signal, independent of a separate load indicative signal, a shift control signal for shifting the transmission from one respective gear to another one of the predefined gears; and a look-up table configured to store a plurality of predetermined transmission shift values that are retrieved by the transmission shift module so that, upon comparison with the received actual and desired speed signals, the first module generates the shift control signal.

18. The controller of claim 17 wherein the control for setting the desired speed signal comprises an operator control handle.

19. The controller of claim 18 wherein the control handle includes a unit for setting a signal indicative of a desired transmission operating condition.

20. The controller of claim 19 wherein the signal link is further configured for transmitting the desired transmission operating condition signal to the controller.

21. The controller of claim 20 further comprising a second module coupled to the transmission for supplying thereto, based on the desired transmission operating condition signal received from the operator handle, a signal for setting the transmission to a respective one of the transmission operating conditions.

22. The controller of claim 19 wherein the desired transmission operating condition is selected from the group consisting of forward, reverse, and neutral.

23. A kit for controlling an engine coupled to a transmission operable in a respective one of multiple predefined gears, the kit comprising:
 a control for setting a desired engine speed signal;
 a signal link coupled to the control to electromagnetically transmit the desired engine speed set therein; and
 an electronic controller coupled to the engine to receive a signal indicative of actual engine speed, the controller further coupled to receive by way of the signal link the desired engine speed signal to generate, based on the received actual engine speed signal and the desired engine speed signal, an engine control signal for controlling engine speed, the controller including a first module coupled to the transmission for supplying thereto, based on the received signal indicative of actual engine speed and the desired engine speed signal, and without receiving a seperate load indicative signal, a shift control signal for shifting the transmission from one respective gear to another one of the multiple predefined gears.

24. The kit of claim 23 further comprising a look-up table configured to store a plurality of predetermined transmission shift values that are retrieved by the first module so that, upon comparison with the received actual and desired speed signals, the first module generates the shift control signal.

25. The kit of claim 23 wherein the control for setting the desired speed signal comprises an operator control handle.

26. The kit of claim 25 wherein the control handle further provides a unit for setting a signal indicative of a desired transmission operating condition.

27. The kit of claim 26 wherein the signal link is further configured for transmitting the desired transmission operating condition signal to the controller.

28. The kit of claim 27 wherein the controller further comprises a second module coupled to the transmission for supplying thereto, based on the desired transmission operating condition signal received from the operator handle, a signal for setting the transmission to a respective one of the transmission operating conditions.

29. The kit of claim 26 wherein the desired transmission operating condition is selected from the group consisting of forward, reverse, and neutral.

30. The kit of claim 23 wherein the controller further includes an engine control module coupled to the engine to generate the predetermined engine control signal for controlling engine operation based on comparing the respective signal values of the actual engine speed and the desired engine speed.

31. A method for controlling a marine engine coupled to a transmission operable in a respective one of multiple predefined gears, the method comprising:
 setting a desired engine speed signal;
 electromagnetically transmitting the desired engine speed signal from the control to a controller by way of a signal link;
 supplying to the controller a signal indicative of actual engine speed and the desired engine speed signal to generate, based on the respective signal values of the actual engine speed and the desired engine speed, an engine control signal for controlling engine speed; and
 supplying to the transmission a shift control signal for automatically shifting the transmission from one gear to another one of the predefined gears, the shift control signal being generated by a transmission shift module in the controller based on the received signal indicative of actual engine speed and the desired engine speed signal and not based on a seperate load indicative signal.

32. The method of claim 31 further comprising a step of storing a look-up table having a plurality of predetermined transmission shift values that are retrieved by the first module so that, upon comparison with the received actual and desired speed signals, the transmission shift module generates the shift control signal.

33. The method of claim 31 wherein the step for setting the desired speed signal comprises setting an operator control handle.

34. The method of claim 33 further comprising a step of setting a signal indicative of a desired transmission operating condition.

35. The method of claim 34 further comprising a step of transmitting the desired transmission operating condition signal to the controller by way of the signal link.

36. The method of claim 35 further comprising a step of supplying to the transmission a signal for setting the transmission to a respective one of the transmission operating conditions, that signal being generated in a second module in the controller based on the desired transmission operating condition signal received from the operator handle.

37. The method of claim 34 wherein the desired transmission operating condition is selected from the group consisting of forward, reverse, and neutral.

38. The method of claim 31 wherein the predetermined engine control signal for controlling engine speed is generated based on comparing the respective signal values of the actual engine speed and the desired engine speed.

* * * * *

UNITED STATES PATENT AND TRADEMARK OFFICE
CERTIFICATE OF CORRECTION

PATENT NO. : 6,293,838 B1  Page 1 of 1
DATED : September 25, 2001
INVENTOR(S) : Arthur Richard Ferguson It is certified that error appears in the above-identified patent and that said Letters Patent is hereby corrected as shown below:

<u>Column 5,</u>
Line 18, change "with" to -- without -- before "a separate load indicative signal".

Signed and Sealed this

Eleventh Day of June, 2002

Attest:

JAMES E. ROGAN
Attesting Officer   Director of the United States Patent and Trademark Office